Sept. 29, 1970  S. MARTORANA  3,531,319
METHOD AND APPARATUS FOR THE COATING IN
VACUO OF A MOVING RIBBON
Filed Sept. 9, 1964

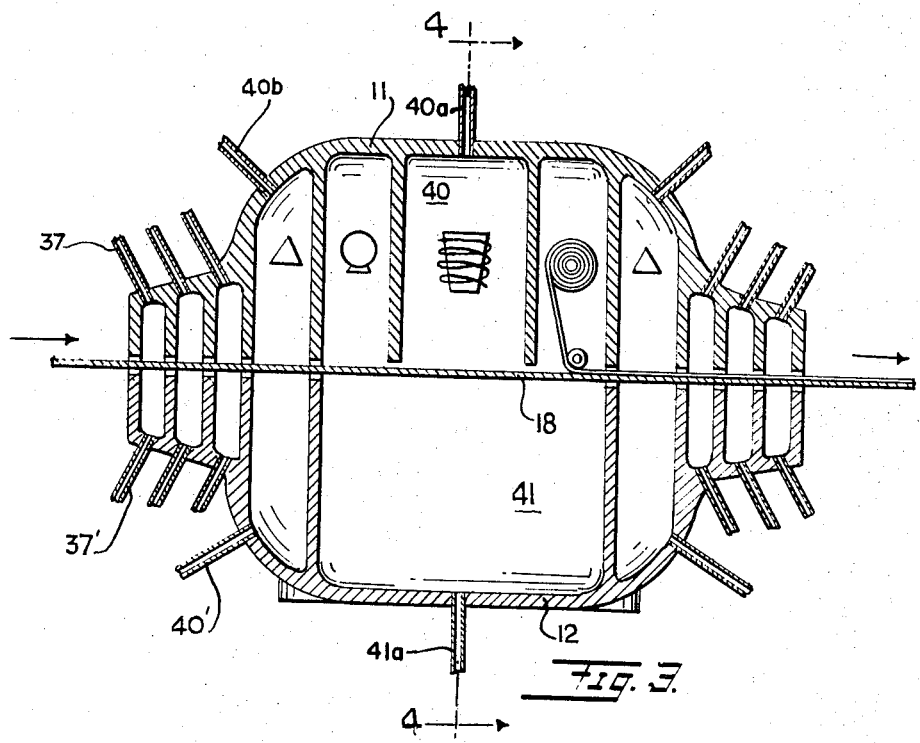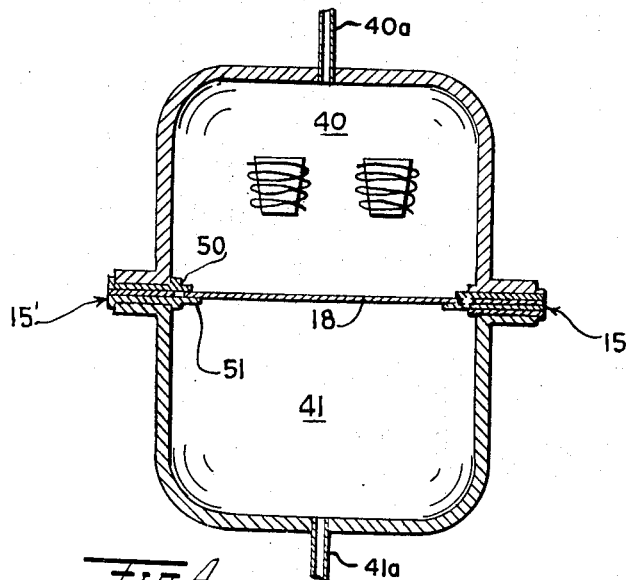

INVENTOR.
MARTORANA, SALVATORE
BY
Bauer and Seymour
ATTORNEYS

United States Patent Office 3,531,319
Patented Sept. 29, 1970

3,531,319
METHOD AND APPARATUS FOR THE COATING IN VACUO OF A MOVING RIBBON
Salvatore Martorana, Milan, Italy, assignor to Compagnie de Saint-Gobain, Neuilly-sur-Seine, France
Filed Sept. 9, 1964, Ser. No. 395,254
Claims priority, application Italy, Sept. 16, 1963, 39,021/63
Int. Cl. C23c 11/00
U.S. Cl. 117—107.1    12 Claims

ABSTRACT OF THE DISCLOSURE

Method and apparatus for the coating in vacuo of a ribbon of material such as glass, paper or plastic, moving continuously through the coating chamber. The coating chamber is constructed and arranged so that the ribbon itself acts as a septum dividing the chamber into upper and lower compartments. Discrete connections for exhaustion of air from the upper and lower compartments enable a higher absolute pressure in the lower one, so that the pressure differential acts per se to support that portion of the ribbon instantaneously traversing the chamber. Discrete sequential chambers in advance of, and downstream of the coating chamber are maintained respectively, at successively decreasing and increasing absolute pressures. The invention may be used to coat ribbons having a width greater than the effective width of the apparatus.

---

This invention relates to the treatment of moving sheets of material, for instance glass, paper, or plastic, under conditions which require a substantial degree of vacuum. It is particularly related to the establishment and maintenance of the vacuum and to an apparatus which houses the operative machinery and provides accurate control of the pressure. It is to be understood that the same apparatus is as capable of establishing and maintaining high pressure within as low, but as the problems which led to the invention arose in connection with a vacuum process the invention will be described in relation thereto. The problem which was solved by this apparatus was the maintenance of constant low pressure during the metallization of one side of a glass sheet, and the invention will be described in connection therewith.

This invention relates, inter alia, to an apparatus and a process for mantaining constant low pressure within a chamber wherein a vacuum process is to be carried out. An example of such a process is the vaporization under vacuum of a metal which is to be applied to a face of a moving sheet of material such as glass, plastic, or paper. It has been difficult to apply very thin layers of metallic material to such moving sheets uniformly, especially because of variations in pressure which affect the process. Examples of metals which are applied by such processes are aluminum, lead, and silver, for instance in the continuous process of making mirrors, but it has been difficult to make the deposit to a uniform thickness which will reflect evenly and exercise a minimum of absorption.

It is an object of the present inventiton to provide an apparatus and method for controlling the pressure within a chamber wherein such operations are carried out. Another object is to produce a continuous mirror from a moving glass sheet, or from plastic material, by metallization under vacuum, the metallization being, if necessary, followed by other surface treatments at the same or different degrees of pressure, for instance treatments which are designed to protect the metallic surface.

Numerous investigators have made attempts to accomplish the metallization of a moving sheet but heretofore it has been impossible to accomplish a metallization continuously and uniformly especially in very thin layers, and particularly when such layers are very thin with respect to the thickness of the material to which they are applied.

The present apparatus overcomes these difficulties and permits the continuous application of very thin coatings to moving sheets even when the coatings are excessively thin compared to the thickness of the sheets to which they are applied. The invention also accomplishes the application of such coatings despite conditions of static electricity which prevent such applications by known methods. The apparatus can maintain constant a desired difference in pressure between the pressure within a working chamber and that outside the chamber, even when that difference of pressure is relatively great.

The objects of the invention are accomplished generally speaking by a pressure chamber for a moving sheet which comprises mating shells having matching edges and having a series of aligned baffles transverse to the course of the sheet and on opposite sides thereof, the shells and baffles being shaped and placed so as to provide ports of entry and egress for the sheet, and to form an inner compartment and a series of compartments adjacent each of said ports, gasket means on the baffles supplying hermetical isolation for such compartments in cooperation with the sheet, and differential pressure means connected to said compartments to establish a stepwise gradation of pressures from compartment to compartment; and by a method of establishing and maintaining conditions of reduced pressure within a space which substantially completely encloses a limited length of a moving sheet, which comprises reducing the pressure about the sheet, as it approaches the said space, in a plurality of steps of sequentially reduced pressure, and increasing the pressure about the sheet, as it leaves the said space, in a plurality of steps of sequentially increased pressure, the first said series of steps reducing the pressure from an initial level to a pressure approaching that of the enclosure, and the second said series of steps restoring the pressure about the sheet to an approach to the said initial level.

The process of the invention involves moving a continuous sheet of material into a working chamber having pressure which differs sharply from the pressure outside the chamber through a series of pressure locks and passing it out of the chamber, after it has been subjected to any treatments which require specialized pressure, through another series of pressure locks. It is another accomplishment of this invention to sustain the sheet, for instance glass, or a sheet of synthetic resin, without or with mechanical supports, and especially to prevent it from sagging under its own weight by supporting it pneumatically in a vacuum. The process and apparatus of the present invention is particularly concerned with moving a sheet through an evacuated metallization chamber which is divided into upper and lower parts by the sheet itself, the lower part being maintained at a higher pressure than the upper so as to maintain the sheet level and to prevent sagging by the force of gravity; a process which is successful even when both upper and lower parts are at subatmospheric pressure.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a longitudinal vertical section through an apparatus according to the invention;

FIG. 3 is a longitudinal vertical section through a modified form of the invention;

FIG. 4 is a transverse vertical section on line 4—4 of FIG. 3;

Figure 1:
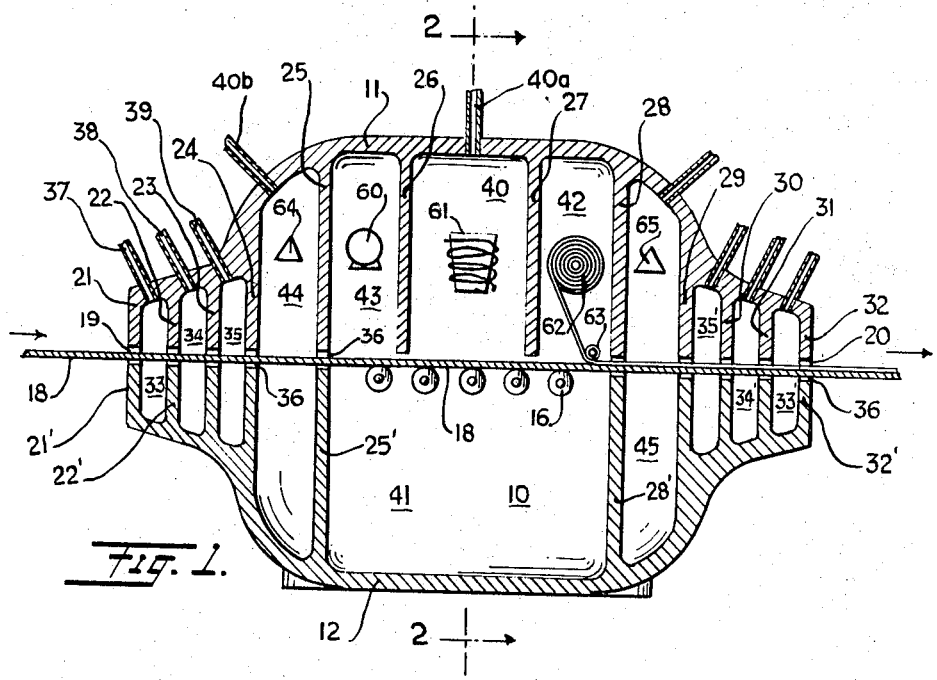
Figure 2:
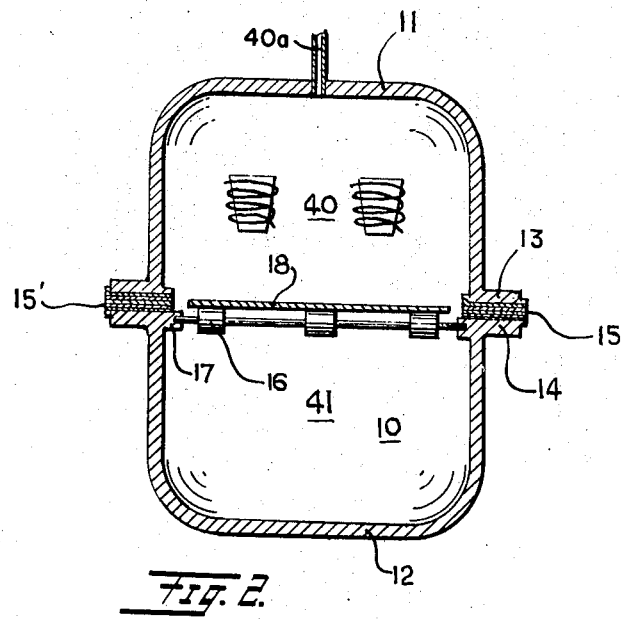
FIG. 2 is a transverse vertical section on the line 2—2 of FIG. 1.

Referring to FIGS. 1 and 2 a working chamber 10 is formed by upper and lower shells 11, 12 of conforming shape having matching edges including flanges 13, 14 which are clamped by means not shown upon a gasket 15; a series of rollers 16 is journaled in bearings 17 formed in the inside of the lower shell and furnish mechanical support for the moving sheet 18 which enters through an inlet port 19 and leaves the chamber through a port of egress 20. The gasket in the figure is divided into two parts 15 and 15' which extend from the inlet to the discharge port on each side of the chamber. The shells 11, 12 are provided with oppositely disposed baffles of which those numbered 21 to 32 are in shell 11 and their corresponding primed numbers are in the lower shell. In these figures the coating of the glass sheet 18 is being applied only to the upper surface of the glass, the different steps of the process are housed in separate compartments provided by certain baffles, and baffles 26, 27 have no counterparts in the lower shell.

The three compartments at each end 33, 34, 35 and 35', 34', 33' are pressure locks, the pressures within which are maintained by gaskets 36 which are affixed to the baffles and either lightly engage the surface of sheet 18 or approach it so closely as to constitute an effective barrier to equalization of pressure. These compartments are evacuated through tubes 37, 38, 39, 40b which establish progressive steps of lowered pressure. Similar tube 40a establishes in the inner chamber 10 that precise degree of vacuum which is required by the process which is being applied to the sheet. The pressure locks outward of the inner chamber establish progressive, stepwise, differentiated pressures in adjacent chambers, the difference of pressure in any two chambers being maintained at a level which prevents the rapid evacuation of one chamber by the next.

The sheet divides the chamber into upper and lower compartments 40, 41 which are freely interconnected at the edges of the glass sheet, as shown in FIG. 2, so that the pressure maintained within that space is uniform. The baffles 26, 27 do not have gaskets which approach the sheet closely enough to act as pneumatic baffles so chambers 40, 42, and 43 are also at equal pressure. The baffles 25, 25', 28, 28' are equipped with pneumatically effective gaskets so that the compartments 44, 45 can be maintained at different pressures corresponding to the steps of the process which are carried on therewithin. These compartments, thus, may form a part of the pneumatic lock system. The gaskets may be made of felt, rubber, synthetic resin and may be as hard or as soft as the circumstances of the process permit. Such gasket materials are known in themselves.

In the manipulation of the apparatus, assuming that the pressure in the inner chamber is $10^{-5}$ mm. of mercury, the pressure in compartment 44 may be established at $4 \cdot 10^{-4}$ mm., that in chamber 35 may be $1.5 \cdot 10^{-2}$ mm., that in 34 may be 0.5 mm., and that in 33 may be 20 mm., the pressure outside being assumed to be atmospheric, or 760 mm. of mercury. Apparatus for establishing different pressures either above or below atmospheric, being well known, is not illustrated.

In FIGS. 3 and 4 is shown a modification in which gaskets 15, 15' are composed of three sheets of gasket material the upper 50 and lower 51 of which project inwardly and serve as guides for the sheet 18 as it moves through the apparatus. The spacing of sheets 50 and 51 is such as to provide a reasonably close fit with the edges of the sheet and, in effect, seal off the upper compartment 40 from the lower one 41 so that a difference of pressure may exist. The lower shell is also provided with tubes for the evacuation of air and which are indicated by primed numbers such as 37', 40' and 41a, enabling the operator to maintain either the same pressure as is established in the upper shell or a higher or lower pressure. The mechanical supports 16 have been eliminated and the shape of the sheet is being maintained, as shown in the drawing, by a pressure in chamber 41 which is enough higher than the pressure in chamber 40 to support the sheet 18 in horizontal position without distortion. This structure enables one to maintain different pressures in all the compartments both horizontally and vertically and eliminates moving mechanical parts and their care.

Figure 5:
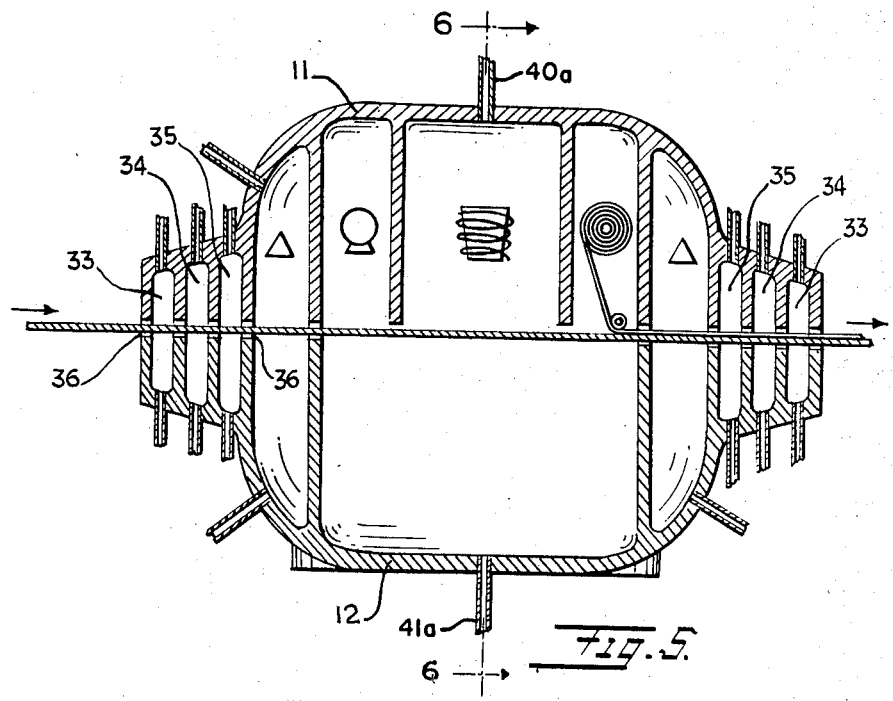
FIG. 5 is a vertical longitudinal section through a second modification.
Figure 6:
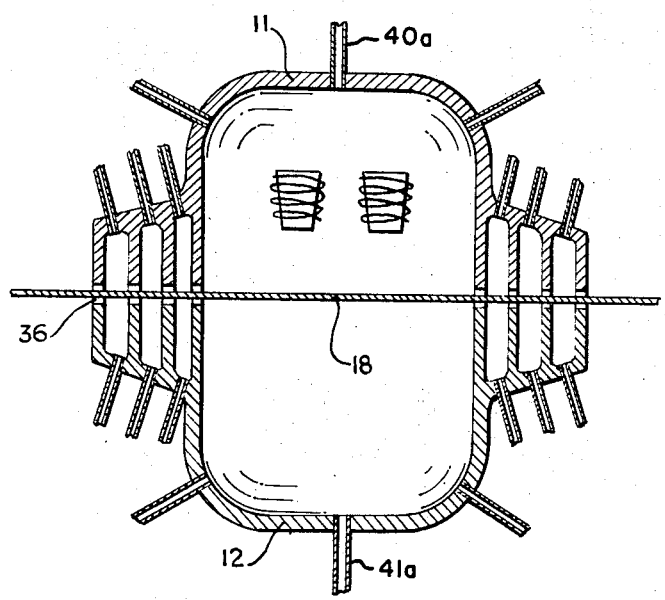
FIG. 6 is a vertical transverse section on the line 6—6 of FIG. 5.

In FIGS. 5 and 6 is illustrated another modification which is adapted for use when only a portion of a sheet 18 is to be worked on. In this case the pneumatic locks extend completely around the apparatus, on the sides as well as on the ends, and the sheet glides between gaskets which are attached to the opposite faces of the partitions. As shown, the sheet constitutes a diaphragm dividing the inner chamber into the upper and lower compartments in which different pressures or the same pressure may be established. Each compartment of the upper and lower shells is provided with its own evacuation tube.

For the foregoing it will be apparent that this novel apparatus provides a superior means for carrying out operations which require a substantial difference between the pressure outside and the pressure inside of it. In the case of flexible sheets of synthetic resin a difference of pressure of a few millimeters, or a few centimeters of pressure between the upper and lower chambers will suffice to support the sheet without strain.

This example is directed to the metallization of a sheet of glass approximately 4 mm. thick which is being drawn through the apparatus from left to right with the object of preparing a continuous mirror. It has been an object of the art to prepare mirrors continuously which have characteristics of reflection which are not inferior to the mirrors which are produced by classic processes, but that object had not been previously obtained. In this invention the chamber where the metallization per se takes place is preceded and followed by other compartments for the application of preliminary and successive treatments which prepare the surface to receive the metallic deposit (for example cleansing, heating and drying, discharging static electricity, etc.), followed by treatments for the protection of the metallic deposit (for instance by applying coatings of oxides, varnish or plastic layers) in order to protect the metal surface in use. The metallization chamber 40 is of classic type, the type and number of metallic evaporators being such as to insure even distribution and the best results, but in all cases, and this is a part of the invention, this chamber, like the compartments which precede and follow it, will be divided by the glass sheet into upper and lower compartments which either do or do not communicate directly with each other, as has been explained hereinabove. This construction enables one to prevent a difference in pressure above and below the sheet from distorting or rupturing the sheet. When one proceeds to the metallization of a sheet of which the lateral dimensions are great with respect to its thickness, and when the vacuum chamber also has large dimensions, if the sheet is exclusively supported by the gaskets and is in danger of sagging, one may insert mechanical supports for the ribbon. One may also combine mechanical supports with differences in pressure to minimize the contact between the mechanical supports and the sheet.

Assuming that the sheet 18 is to be metallized only on its upper surface, the upper, inner chamber is divided by baffles 26, 27 into compartments 40, 42, 43. The apparatus which is to discharge static electricity is indicated schematically at 60 in compartment 43. The metal vaporizer 61 is installed in compartment 40, and the compartment 42 may receive apparatus adapted to protect the metal layer which has been applied in compartment 40. In the drawing this involves a roll 62 of pellicular plastic such as polyvinyl chloride, which is applied to the surface beneath roller 63 in a known manner. This compartment could also receive a deposit of special oxides or a spray of synthetic resin. In compartment 44 is schematically indicated apparatus 64 for drying and preheating the sheet, and in compartment 45 is shown a similar apparatus 65 for heating the film or for drying and setting a plastic and causing it to adhere more firmly to the sheet 18.

It will be apparent that the device of FIGS. 1 and 2 can be used to coat the entire surface of the sheet 18, that the device of FIGS. 3 and 4 will coat the entire surface other than a narrow strip along each edge which is beneath the upper guide 50, these edges being readily removed by cutting the sheet after its withdrawal from the chamber, and that the device of FIGS. 5 and 6 will apply the coating only to the central portion of the sheet, the outer portions remaining unaffected by the treatment. The working apparatus can be placed in the lower shell so as to coat the under side of the sheet, or the device can be reversed so that shell 11 becomes the lower. When it is advisable to apply a treatment to each side of the sheet, apparatus will be mounted in each shell. The chambers can be maintained with gaseous atmospheres as desired by providing appropriate inlets and outlets or by simultaneously using the tubes shown in the drawing for that purpose.

One may increase or decrease the number of chambers according to the operations that are to be carried on.

The advantages of the invention are in the attainment of the objects of the invention as to apparatus, and in the novel process of metallization. A particular advantage lies in establishing and maintaining a constant degree of high or low vacuum in a chamber devoted to the operation of a vacuum process, and in supporting a flexible sheet horizontally by establishing different degrees of vacuum above and below it. Another advantage lies in this that the apparatus is equally effective when the pressures inside are higher than those outside.

As many apparently widely different embodiments of the present invention may be made without departing from the spirit and scope thereof, it is to be understood that the invention is not limited to the specific embodiments.

What is claimed is:

1. The method of vacuum coating a ribbon of material, comprising, maintaining reduced pressure within a chamber, moving the ribbon in the direction of its length substantially continuously into and out of the chamber to sequentially subject a limited moving surface area of the ribbon to the reduced pressure within the chamber, maintaining different pressures within the chamber effective, respectively, upon opposite surface areas of the ribbon therewithin, and coating one said surface of the ribbon by condensation of a vapor while within the chamber.

2. The method of claim 1, and applying to the surface of the ribbon coated within the chamber and before exit therefrom, a layer of protective material.

3. The method of claim 1, passing the ribbon through discrete enclosures of successively reduced absolute pressure just prior to its entry into the chamber, and passing the ribbon through discrete enclosures of successively increasing absolute pressure just subsequent to its exit from the chamber.

4. The method of claim 1, and utilizing respective opposed surface areas of the ribbon to define essentially discrete compartments upon opposite side areas thereof within the chamber, and to confine the greater of the pressures to one said compartment.

5. The method of claim 4, the respective side edges of the ribbon passing through and within the chamber in sealing relation with wall portions thereof, to define said discrete compartments.

6. The method of claim 1, movement of the ribbon in and through the chamber having at least a horizontal component resulting in a gravitational force component effective thereon, and maintaining the pressure effective upon the downward surface area of the ribbon at a value sufficiently greater than the pressure effective upon the upward surface area of the ribbon, within the chamber, to create a total effective vertical component of force substantially neutralizing said gravitational force component.

7. The method of claim 6, movement of the ribbon in and through the chamber being substantially horizontal.

8. Apparatus for vacuum coating a substantially continuously moving ribbon of material, comprising, a hollow casing having an entrance opening for the ribbon in one wall thereof, an exit opening for the ribbon in an opposite wall thereof, first means fixed with said casing to cooperate with that portion of the ribbon instantaneously traversing said casing, to divide the casing into essentially discrete upper and lower compartments at respectively opposite surface areas of the ribbon within said casing, and sealed, one from the other, second means in one said compartment to continuously coat the corresponding surface area of a ribbon passing through said casing, and first and second conduit means connected respectively with said upper and lower compartments, to maintain different low absolute pressures upon opposite surfaces, respectively, of that portion of a ribbon instantaneously traversing between said upper and lower compartments.

9. The apparatus of claim 8, said casing having a dimension normal to the direction of travel of the ribbon therethrough, less than the width of the ribbon, said casing comprising separable first and second halves each having an edge portion in continuous sealing relation with a respective one of opposite surface areas of the ribbon, to thereby divide the casing into discrete compartments, as aforesaid.

10. The apparatus of claim 8, said casing including a first series of spaced walls defining sequential discrete compartments adjacent said entrance opening, and a second series of spaced walls defining sequential discrete compartments adjacent said exit opening, there being aligned openings in said walls to pass the ribbon into and out of said casing, and a plurality of conduits each in communication with a respective one of said compartments, to maintain predetermined pressure gradients in each said series of sequential discrete compartments.

11. The apparatus of claim 8, said first means comprising gasket means sealingly engaging respective side edges of the ribbon passing in and through said casing.

12. The apparatus of claim 11, said casing comprising first and second hollow separable halves having flanged meeting edges, and means securing together the flanges of said edges, with said gasket means interposed there-between, said gasket means being interrupted to define said entrance and exit openings.

References Cited
UNITED STATES PATENTS

| | | | |
|---|---|---|---|
| 2,384,500 | 9/1945 | Stell | 118—49.1 |
| 2,925,062 | 2/1960 | Schmindt | 118—49 |
| 2,930,347 | 3/1960 | Bulloff | 118—49 |
| 2,996,410 | 8/1961 | Hnilicka | 117—107.1 |
| 3,000,346 | 9/1961 | Hnilicka | 117—107.1 |
| 3,040,702 | 6/1962 | Eng et al. | 117—107 |
| 3,043,715 | 7/1962 | Clough | 117—107 |
| 3,123,493 | 3/1964 | Buck | 117—107.1 |
| 2,968,583 | 1/1961 | Barth | 117—107.1 X |
| 3,054,700 | 9/1962 | Steinberg | 156—1 |
| 3,086,882 | 4/1963 | Smith et al. | |
| 3,197,861 | 8/1965 | Brick | 117—107 X |

ALFRED L. LEAVITT, Primary Examiner

A. GRIMALDI, Assistant Examiner

U.S. Cl. X.R.

117—71; 118—48, 50